(12) United States Patent
Fukuoka (10) Patent No.: US 7,218,068 B2
(45) Date of Patent: May 15, 2007

(54) POWER SOURCE FOR RE-CIRCULATION PUMP AND METHOD OF CONTROLLING THE SAME

(75) Inventor: Tomoyuki Fukuoka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 66 days.

(21) Appl. No.: 11/214,062

(22) Filed: Aug. 30, 2005

(65) Prior Publication Data

US 2006/0120501 A1 Jun. 8, 2006

(30) Foreign Application Priority Data

Aug. 31, 2004 (JP) .............................. 2004-252761

(51) Int. Cl.
   *G21C 7/32* (2006.01)
   *G21C 9/00* (2006.01)
   *H02P 3/00* (2006.01)

(52) U.S. Cl. .................. 318/157; 318/148; 318/140; 376/277; 376/210; 376/379; 376/404; 976/DIG. 202; 976/DIG. 207

(58) Field of Classification Search ................ None
   See application file for complete search history.

(56) References Cited

U.S. PATENT DOCUMENTS

| 4,748,814 A * | 6/1988 | Tanji et al. ............... 60/664 |
| 5,610,957 A * | 3/1997 | Tanikawa et al. .......... 376/210 |
| 5,625,545 A | 4/1997 | Hammond |
| 5,896,434 A * | 4/1999 | Yoshizumi et al. ........ 376/379 |
| 6,417,644 B2 * | 7/2002 | Hammond et al. ......... 318/759 |
| 6,747,881 B2 * | 6/2004 | Schreiber ..................... 363/37 |
| 6,781,331 B2 * | 8/2004 | Mokri et al. ............... 318/157 |
| 2004/0051487 A1 * | 3/2004 | Mokri et al. ............... 318/157 |
| 2005/0201507 A1 * | 9/2005 | Sugiyama et al. ......... 376/277 |
| 2006/0120501 A1 * | 6/2006 | Fukuoka .................... 376/352 |
| 2006/0120502 A1 * | 6/2006 | Tomiki et al. ............. 376/402 |
| 2006/0256912 A1 * | 11/2006 | Katayama et al. ......... 376/277 |

FOREIGN PATENT DOCUMENTS

JP 05142381 A * 6/1993

* cited by examiner

*Primary Examiner*—Lincoln Donovan
*Assistant Examiner*—Eduardo Colon Santana
(74) *Attorney, Agent, or Firm*—Foley & Lardner LLP (57) ABSTRACT

A variable-voltage variable-frequency power source for an electric motor that drives a re-circulation pump for a boiling water nuclear reactor. The power source has a semiconductor electric power converter and a speed controller for controlling the semiconductor electric power converter. When a part of the semiconductor electric power converter comes into an inoperative state, that part is electrically disconnected, and the variable-voltage variable-frequency power source temporarily stops outputting power, thereby idling the re-circulation pump. Thereafter, the power source re-starts outputting power before the re-circulation pump completely stops. Thus, the re-circulation pump keeps operating, without stopping.

12 Claims, 5 Drawing Sheets

FIG. 5

POWER SOURCE FOR RE-CIRCULATION PUMP AND METHOD OF CONTROLLING THE SAME

CROSS-REFERENCE TO A RELATED APPLICATION

This application is based upon and claims the benefit of priority from the prior Japanese Patent Application No. 2004-252761 filed on Aug. 31, 2004; the entire content of which is incorporated herein by reference.

BACKGROUND OF THE INVENTION

The present invention relates to a power source for an electric motor that drives a re-circulation pump for re-circulating the reactor coolant in a boiling water nuclear reactor, and to a method of controlling the power source. More particularly, the invention relates to a variable-voltage variable-frequency power source and a method of controlling the same.

Typically, the output power of a boiling water reactor is controlled by changing the flow rate of the reactor coolant re-circulated in the reactor pressure vessel through the reactor-coolant re-circulation system. The reactor-coolant re-circulation system includes re-circulation pumps, electric power sources for the re-circulation pumps, a re-circulation flow controller, and the like.

Loop pipes connect the re-circulation pumps to the reactor pressure vessel. The re-circulation flow controller generates a speed demand signal. This signal increases or decreases the output of the power source for the re-circulation pump, thus controlling the electric motor. The speed of the re-circulation pump is thereby controlled. This changes the coolant flow rate in the reactor pressure vessel to thereby control the output power of the reactor.

A method of controlling the rotational speed of the re-circulation pump is known, in which a variable-voltage variable-frequency power source is used as power source for the re-circulation pump and controls both the power-source voltage and the power-source frequency.

The conventional variable-voltage variable-frequency power source for re-circulation pump has a semiconductor electric power converter and a speed controller. The semiconductor electric power converter has a semiconductor electric power forward converter and a semiconductor electric power inverter. The forward converter receives the three-phase alternating current (AC) from an in-plant electric power-supply system and converts the alternating current to a direct current (DC). The inverter converts the direct current to an alternating current of any desired frequency.

In accordance with the speed demand signal from the re-circulation flow controller, the semiconductor electric power inverter is controlled so that the ratio of its output voltage to its output frequency may be constant. The electric motor that drives the re-circulation pump is thereby controlled in speed. Ultimately, the speed of the re-circulation pump is controlled. The re-circulation pump and the electric motor operate in conjunction with each other.

In the variable-voltage variable-frequency power source, an over-current may flow in the semiconductor electric power converter if any semiconductor element constituting the converter fails to operate, assuming a short-circuiting state. When the speed controller detects a semiconductor-element failure signal that indicates the generation of the over-current, it stops supplying the semiconductor-element control signal, to the semiconductor electric power converter. The variable-voltage variable-frequency power source is thereby stopped. As a result, the re-circulation pump is stopped. This protects the other elements and the electric motor.

Inspection and maintenance work cannot be performed on the semiconductor electric power converter while a voltage is kept applied to the converter. Inevitably it is necessary to stop the variable-voltage variable-frequency power source. Hence, the re-circulation pump must be stopped in order to perform inspection and maintenance work on the semiconductor electric power converter.

The above-mentioned reactor-coolant re-circulation system has two sub-systems in most cases. Each sub-system has a re-circulation pump. One re-circulation pump may be stopped when any one of the semiconductor elements of the variable-voltage variable-frequency power source fails to operate or when the semiconductor electric power converter is undergoing inspection or maintenance work. In this case, the other re-circulation pump keeps operating. Hence, the coolant can be circulated in the reactor pressure vessel, though the coolant flow rate may decrease.

However, the coolant may stop flowing in the loop pipe provided in the sub-system in which the re-circulation pump is stopped. In this case, the coolant temperature in the loop pipe decreases. Consequently, the difference between the temperature in the loop pipe and that in the reactor pressure vessel increases. The increase in the temperature difference results in an increase in thermal fatigue at the junction between the reactor pressure vessel and the loop pipe. The increase of thermal fatigue adversely influences the plant lifetime.

In addition, when one of the re-circulation pumps is stopped, the coolant re-circulation flow rate may decrease in the core of the reactor. If this is the case, the output power of the reactor will decrease.

Therefore, it is desired that the re-circulation pump is not stopped. However, in the conventional variable-voltage variable-frequency power source for re-circulation pump, the re-circulation pump is stopped when any one of the semiconductor elements of the semiconductor electric power converter fails to operate or when the semiconductor electric power converter is undergoing inspection or maintenance work.

U.S. Pat. No. 5,625,545 discloses a technique of preventing a re-circulation pump from stopping even if one of the semiconductor elements fails to operate, the disclosure of which is hereby incorporated by reference in its entirety. In this technique, semiconductor electric power inverters are connected in series, forming a redundancy inverter unit, one bypass circuit is provided for each semiconductor electric power inverter, and a switch is provided on each bypass circuit. If one of the semiconductor elements fails, the semiconductor electric power inverter including this element is switched to the bypass circuit. The power source can therefore keep operating. In the technique disclosed in U.S. Pat. No. 5,625,545, however, the variable-voltage variable-frequency power source for the re-circulation pump must be stopped in order to repair the failed element. Consequently, the re-circulation pump is stopped.

BRIEF SUMMARY OF THE INVENTION

An object of the present invention is to make it possible to repair the semiconductor electric power converter without stopping the re-circulation pump if one of the elements of the electric power source for the recirculation pump fails to operate, or is to be inspected and/or repaired.

According to an aspect of the present invention, there is provided a power source for an electric motor that drives a re-circulation pump provided in a boiling water reactor for supplying an alternating current. The power source includes: a first bank having an AC-to-DC forward converter and a DC-to-AC inverter that are electrically connected mutually in series, the first bank outputting an alternating current that has a voltage and frequency different from the voltage and frequency of an input alternating current; a second bank connected in parallel to the first bank, the second bank having an AC-to-DC forward converter and a DC-to-AC inverter that are electrically connected mutually in series, and the second bank outputting an alternating current that has a voltage and frequency different from the voltage and frequency of an input alternating current; a speed controller for controlling the first bank and the second bank, thereby to control a speed of the electric motor; and a shut-off mechanism electrically connected in series to the first bank and the second bank, the shut-off mechanism being configured to connect and disconnect the first and second banks electrically, independently of each other. The speed controller: temporarily stops the first bank and the second bank, thereby idling the re-circulation pump, while only the first bank remains in an inoperative state; causes the shut-off mechanism connected to the first bank to disconnect the first bank, while the re-circulation pump is idling; re-starts only the second bank when a speed of the electric motor reaches a predetermined speed after the first bank is disconnected while the re-circulation pump is idling, thereby causing only the second bank to control the speed of the electric motor; and re-starts the first bank after controlling the speed of the electric motor by means of only the second bank, thereby causing both the first bank and the second bank to control the speed of the electric motor.

According to another aspect of the present invention, there is provided a method of controlling a power source for an electric motor that drives a re-circulation pump provided in a boiling water reactor for supplying an alternating current. The power source includes: a first bank having an AC-to-DC forward converter and a DC-to-AC inverter that are electrically connected mutually in series, the first bank outputting an alternating current that has a voltage and frequency different from the voltage and frequency of an input alternating current; a second bank connected in parallel to the first bank, the second bank having an AC-to-DC forward converter and a DC-to-AC inverter that are electrically connected mutually in series, and the second bank outputting an alternating current that has a voltage and frequency different from the voltage and frequency of an input alternating current; a speed controller for controlling the first bank and the second bank, thereby to control a speed of the electric motor; and a shut-off mechanism electrically connected in series to the first bank and the second bank, the shut-off mechanism being configured to connect and disconnect the first and second banks electrically, independently of each other. The method includes: a pump-idling step of temporarily stopping both the first bank and the second bank, thereby idling the re-circulation pump, while only the first bank remains in an inoperative state; a first-bank disconnecting step of causing the shut-off mechanism connected to the first bank to disconnect the first bank, in the pump-idling step; a second-bank driving step of re-starting only the second bank when a speed of the electric motor reaches a predetermined speed after the first-bank disconnecting step in the pump-idling step, thereby causing only the second bank to control the speed of the electric motor; and a restored operation step of re-starting the first bank after the second-bank driving step, thereby causing both the first bank and the second bank to control the speed of the electric motor.

BRIEF DESCRIPTION OF THE DRAWINGS

The above and other features and advantages of present invention will become apparent from the discussion herein below of specific, illustrative embodiments thereof presented in conjunction with the accompanying drawings, in which.

DETAILED DESCRIPTION OF THE INVENTION

A power source for a re-circulation pump and a controller thereof, both according to the first embodiment of this invention, will be described with reference to FIGS. 1 to 4.

Figure 1:
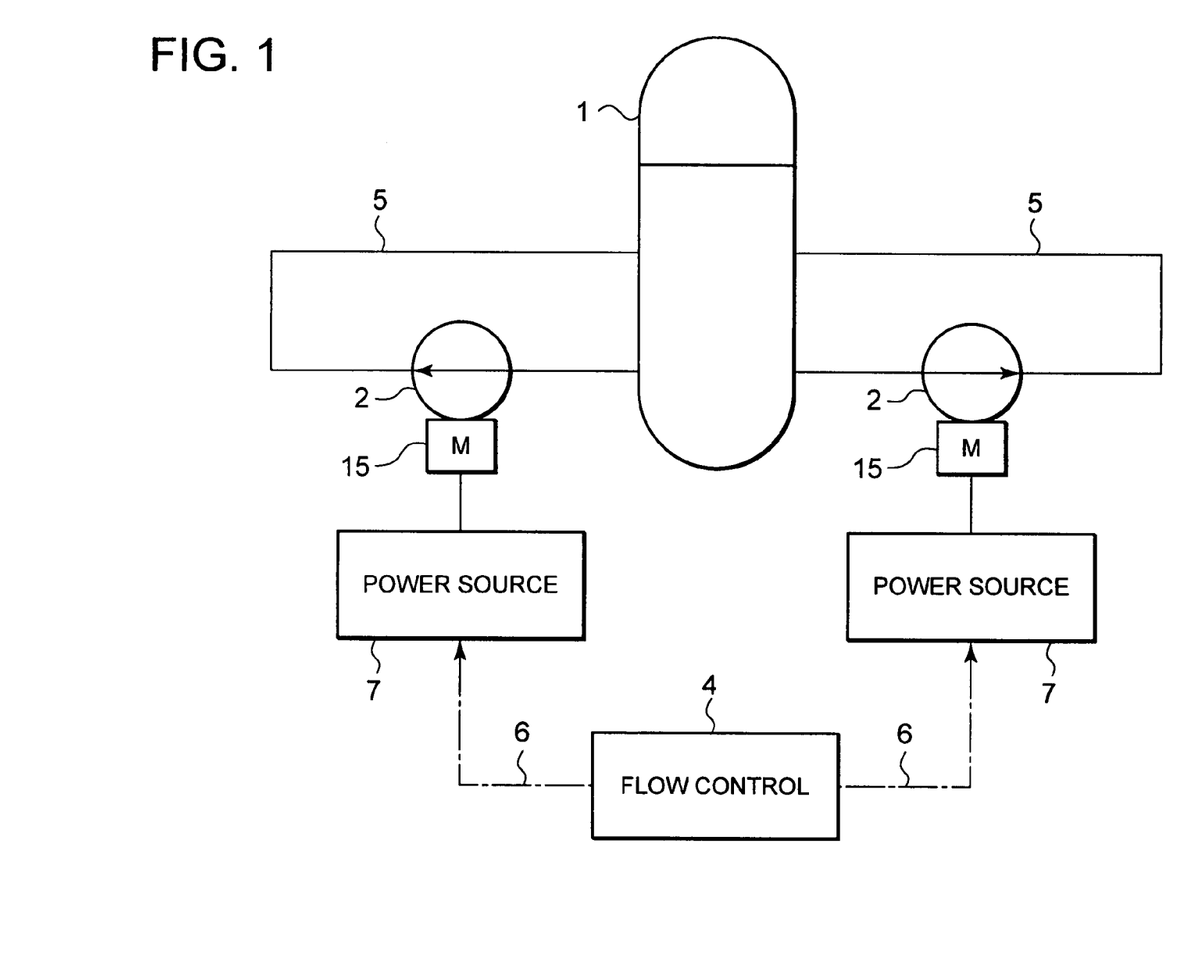
FIG. 1 is a schematic diagram showing a reactor-coolant re-circulation system for use in a boiling water nuclear reactor, according to the present invention.

A boiling water nuclear reactor has a reactor pressure vessel 1 as shown in FIG. 1. A reactor-coolant re-circulation system changes the coolant flow rate in the reactor pressure vessel 1, thereby controlling the output power of the reactor. As FIG. 1 shows, the reactor-coolant re-circulation system has two re-circulation pumps 2, two power sources 7 for driving the re-circulation pumps 2, respectively, and a re-circulation flow controller 4.

The re-circulation pumps 2 are driven by their respective electric motors 15. The re-circulation pumps 2 are connected to the reactor pressure vessel 1 by their respective loop pipes 5. The re-circulation flow controller 4 generates a speed demand signal 6. The speed demand signal 6 increases or decreases the output powers of the power sources 7, controlling the electric motors 15. Thus controlled, the electric motors 15 control the speeds of the re-circulation pumps 2. This changes the coolant flow rate in the reactor pressure vessel 1, thereby controlling the output power of the reactor.

To control the re-circulation pumps 2, variable-voltage variable-frequency power sources are used as the power sources 7. Each variable-voltage variable-frequency power source controls the power-supply voltage and power-supply frequency, thereby to control the speed of the re-circulation pump.

As shown in FIG. 1, a typical reactor-coolant re-circulation system has two sub-systems. Each sub-system has one re-circulation pump 2. One of the re-circulation pumps 2 may be stopped because the variable-voltage variable-frequency power source 7 fails to operate or is undergoing inspection or maintenance work. Even in this case, the other re-circulation pump 2 keeps operating. The coolant can be circulated in the reactor pressure vessel 1, though the coolant flow rate may decrease to some extent.

Figure 2:
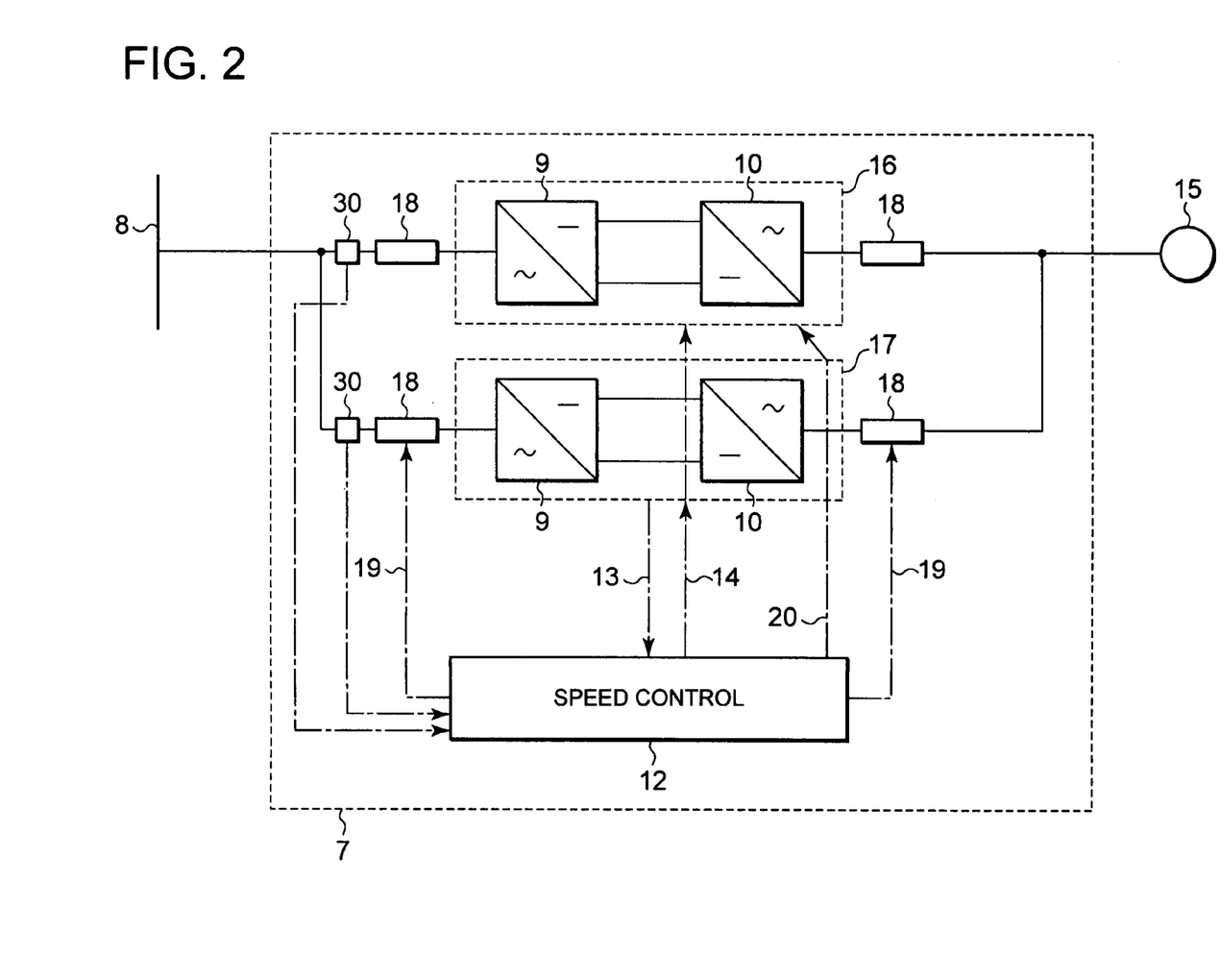
FIG. 2 is a block diagram of a power source for a re-circulation pump, according to a first embodiment of the invention.

As shown in FIG. 2, each variable-voltage variable-frequency power source 7 has a speed controller 12 and two semiconductor electric power converters 16 and 17. The converters 16 and 17 are formed in two parallel banks. Each bank 16, 17 has a semiconductor electric power forward converter 9 and a semiconductor electric power inverter 10. The converter 9 receives a three-phase alternating current from an in-plant electric power supply system 8 and converts the alternating current to a direct current. The inverter 10 converts the direct current to an alternating current of any desired frequency. Electric shut-off switches 18 such as breakers or semiconductor switches are connected in series to each bank 16, 17.

A speed demand signal 6 is supplied from the re-circulation flow controller 4 to both semiconductor electric-power converters 16 and 17. The signal 6 controls each converter such that the ratio between the output voltage and output frequency of the converter may become constant. This controls the speed of the electric motor 15 that drives the re-circulation pump 2.

The banks of semiconductor electric power converters 16 and 17 (or banks) are static voltage-type inverters. Each of them includes a semiconductor electric power forward converter 9 and a semiconductor electric power inverter 10, as described above. Hence, they first convert the alternating current supplied from the in-plant electric power supply system 8, to a direct current, then invert the direct current to an alternating current of any desired voltage and frequency, and finally supply the alternating current to the electric motors 15. The speed controller 12 controls the banks 16 and 17, causing them to generate a voltage and frequency in accordance with the speed demand signal 6 supplied from the re-circulation flow controller 4 (FIG. 1).

Assume that one of the semiconductor elements of the first bank 16 fails to function while the variable-voltage variable-frequency power source 7 is operating. Then, the speed controller 12 receives a semiconductor-element failure signal 13. When the bank 16 is to be inspected and/or maintained, the speed controller 12 receives a command signal for stopping the supply of a signal that controls the semiconductor element. On receiving the semiconductor-element failure signal 13 and the signal for stopping the supply of the control signal, the speed controller 12 stops outputting the semiconductor-element control signal 14 to the banks 16 and 17. The variable-voltage variable-frequency power source 7 then stops operating. At this time, the re-circulation pump assumes a free-running state or an idling mode, in which it operates by inertia, and its speed gradually decreases.

To determine whether a semiconductor element fails to operate, each bank provided in the variable-voltage variable-frequency power source 7 has two current detectors 30, each for one bank. Each current detector 30 may detect the current input to the bank or the current output therefrom. In the power source 7 of FIG. 2, each current detector 30 detects the current input to the bank. If the current input to or output from the bank exceeds a stipulated limit value, it is determined that a failure has developed in one of the semiconductor elements provided in the bank. It can be so determined, because an ordinary semiconductor element is short-circuited when it has a failure and an over-current flows in the element when the element is short-circuit. Alternatively, if the current flowing in the element is too small, it can be determined that a failure has developed in the semiconductor element.

When a failure develops in one of the semiconductor elements provided in, for example, the first bank 16, or when the first bank 16 is to be inspected and/or maintained, the speed controller 12 stops supplying the semiconductor-element control signal 14 to the banks 16 and 17. The variable-voltage variable-frequency power source 7 then stops operating. At the same time, the speed controller 12 supplies a shut-off signal 19 to the electric shut-off switches 18 that are connected to the input and output of the first bank 16 that includes a failed element or that should be inspected and/or maintained. On receiving the shut-off signal 19, the electric shut-off switches 18 electrically disconnect the first bank 16 from the circuit.

In the power source 7, the first bank 16 that includes a failed element or that should be inspected and/or maintained is disconnected, and only the second bank 17 that has no failed elements is operated. First, the speed controller 12 stops supplying the semiconductor-element control signal 14 to the second bank 17. This sets the re-circulation pump 2 to operate in the free-running mode. When a speed detector (not shown) detects that the speed of the re-circulation pump 2 reaches the value at which it can operate in the case where the only the second bank 17 operates, the speed controller 12 re-outputs a semiconductor-element control signal 20 appropriate for the speed to the second bank 17. Thus, the semiconductor elements in the second bank 17 are optimally controlled. The re-circulation pump 2 is driven at a decreased speed, and is not stopped.

Now an operation of the power source for a re-circulation pump, according to the first embodiment of the invention will be explained, with reference to FIG. 3, which is a timing chart schematically representing changes in the above-mentioned pump speed (i.e., the speed of the electric motor).

First, both banks 16 and 17 operate, whereby the power source operates in normal mode. Assume that a failure develops in the first bank 16 at time t1. The current detector 30 of the first bank 16 detects an over-current. At time t2, the speed controller 12 generates a command from an over-current signal. The command stops both the first bank 16 and the second bank 17, and the electric motor 15 starts operating in a free-running or idling mode. The first bank 16, in which the failure has developed, is electrically disconnected. Thereafter, at time t3 when the rotational speed of the electric motor 15 falls to a value at which single-bank operation can be performed, the second bank 17 starts operating in a single-bank mode. While only the second bank 17 is operating, the first bank 16, which is electrically disconnected, is repaired.

At time t4 when the first bank 16 is repaired, the second bank 17 is stopped again, and free-running mode is started again for a short time period. At time t5 when the speed of the electric motor 15 falls to a value at which both banks 16 and 17 can operate in synchronism, the first bank 16 and the second bank 17 are operated in parallel again. Thereafter, the rotational speed of the electric motor 15 gradually increases with the two banks in operation. At time t6, the power source 7 starts operating in normal mode at the rated pump speed again.

Each power source 7 can be designed so that the electric motor 15 may rotate at any percentage of the rated value during single-bank operation. The power source 7 may be designed such that the electric motor 15 rotates at, for example, 100% of the rated speed during single-bank operation. In the instance of FIG. 3, the electric motor 15 rotates at 70% of the rated speed during single-bank operation.

Now another operation of the first embodiment will be explained with reference to FIG. 4. The operation up to time t4 is the same as the operation illustrated in FIG. 3. In the instance shown in FIG. 4, when the first bank 16 is repaired during single-bank operation of the second bank 17, the second bank 17 is not stopped for a free-run again (at time t4). At time t7, the first bank 16 starts operation again, while the second bank 17 continues to operate. Thus, the two-bank operation starts again. In this case, the output voltage of the first bank 16 is gradually increased from zero so that both banks may operate in synchronism. At time t8, the power source starts operating in the normal mode at the rated pump speed again.

Figure 3:
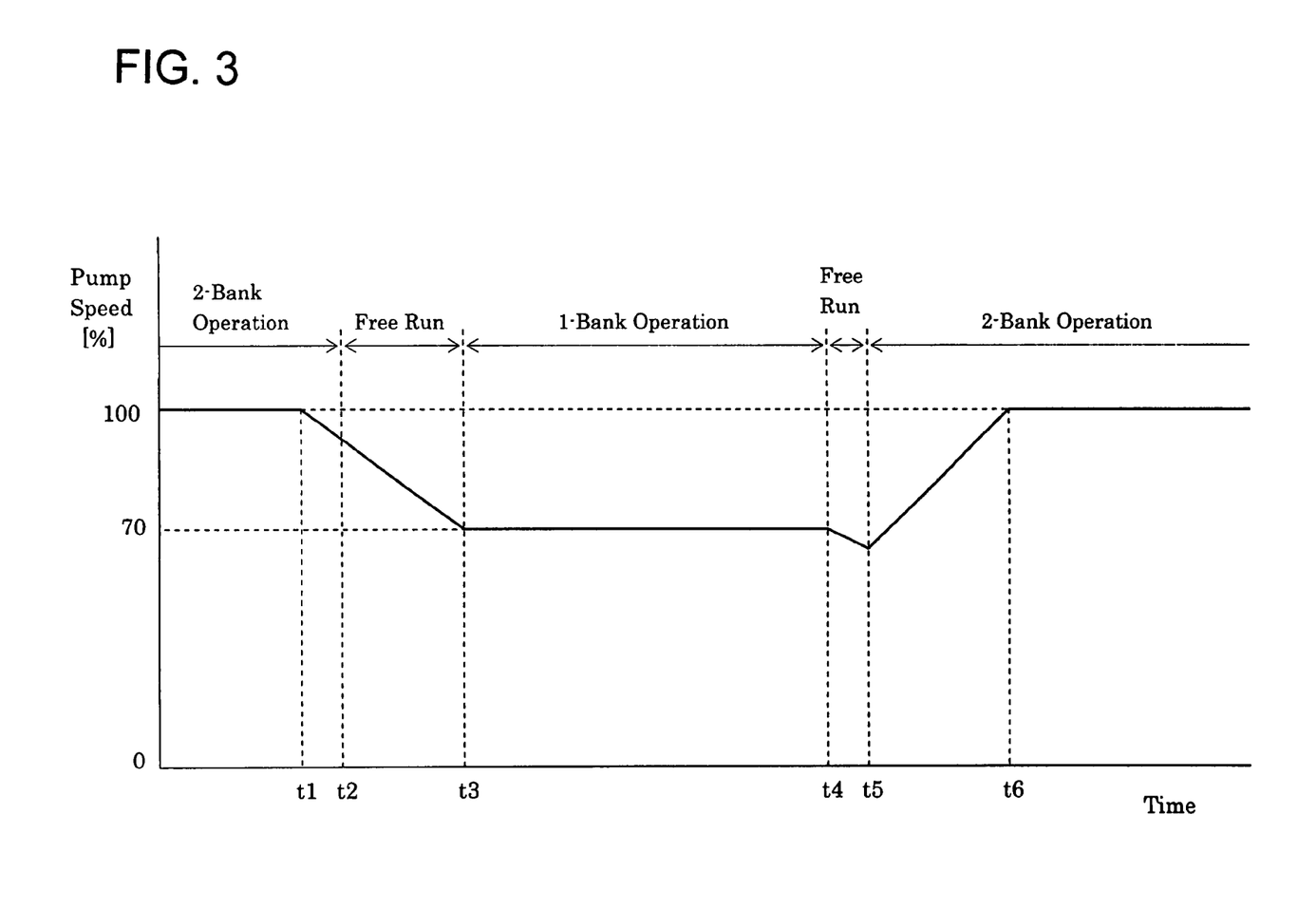
FIG. 3 is a timing chart schematically representing changes in the pump speed that are observed when the power source for the re-circulation pump according to the first embodiment of the invention operates in a mode.
Figure 4:
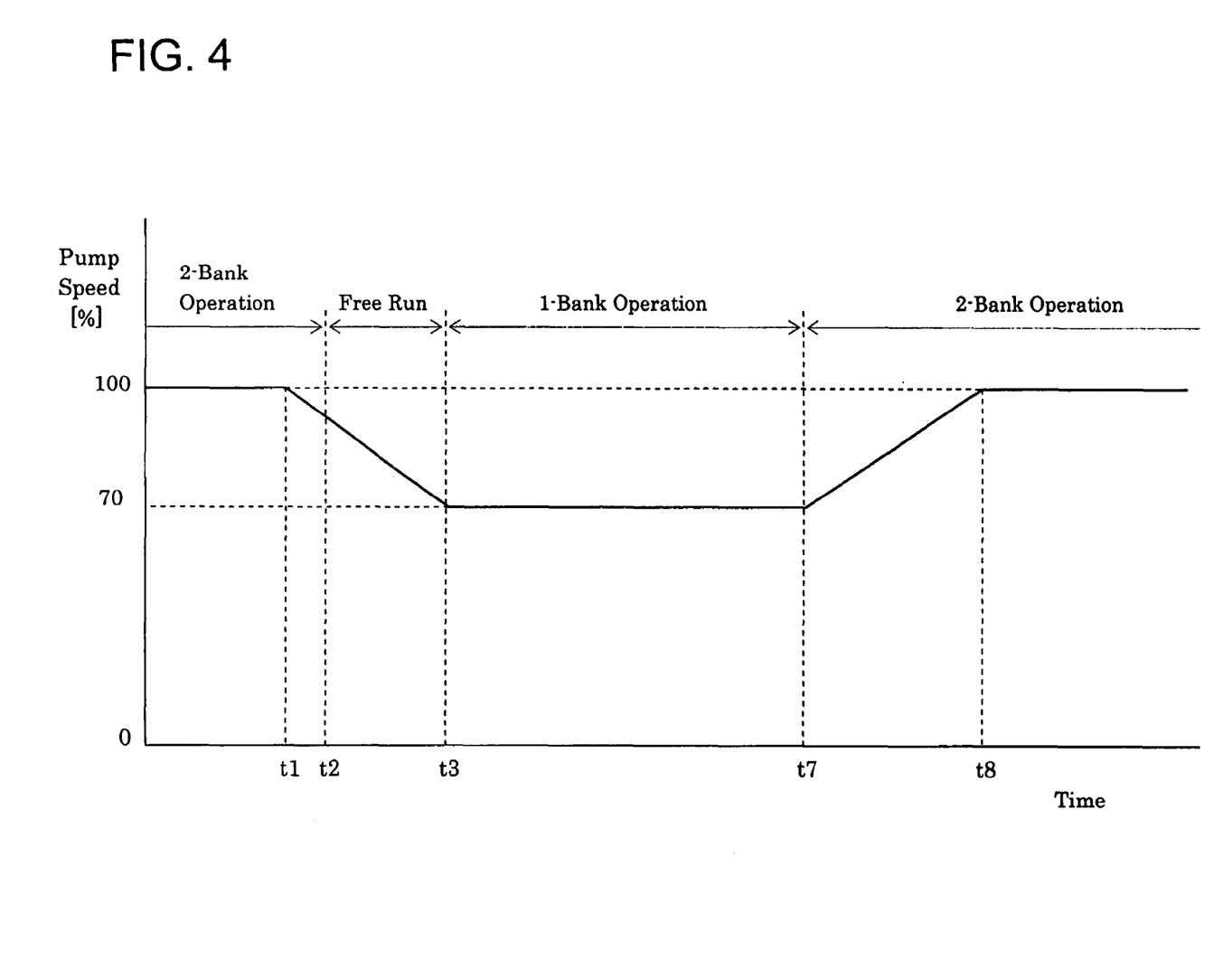
FIG. 4 is a timing chart schematically representing changes in the pump speed that are observed when the power source for the re-circulation pump according to the first embodiment of the invention operates in another mode.

In the operation shown in FIG. 3 or FIG. 4, a failure in the first bank 16 is assumed. If the first bank 16 is disconnected to be inspected, time t1 and time t2 will be identical. After time t1 or t2, the power source operates in the same way as illustrated in either FIG. 3 or FIG. 4.

In the present embodiment, the first bank 16 is electrically disconnected, if one of the semiconductor elements fails to operate in the first bank 16, which would possibly stop the variable-voltage variable-frequency power source 7, or if the first bank 16 undergoes inspection or maintenance work. Thus, only the second bank 17, which has no failed elements, can be operated.

Hence, the variable-voltage variable-frequency power source 7 is not stopped and can continuously drive the re-circulation pump at the same speed or a lower speed. The coolant can therefore keep circulating in the loop pipe, though at a reduced flow rate. This maintains the coolant in the loop pipe at a certain temperature and ultimately prevents the thermal fatigue at the junction between the reactor pressure vessel and the loop pipe from increasing.

Each bank has a capacity of at least 50% of the total capacity needed to operate the pump at the rated speed. If each bank has a larger capacity, decrease in the reactor output power during single-bank operation is suppressed. Furthermore, if each one of the banks has 100% capacity or a full redundancy, the re-circulation pump can be operated at a rated speed during single-bank operation mode.

When one of the semiconductor elements has a failure or needs inspection and/or repair, the bank 16 that includes this element can be removed from the variable-voltage variable-frequency power source 7, while the variable-voltage variable-frequency power source 7 continues operation with the single bank 17 that does not include failed elements or that is to be inspected and/or repaired.

A power source for a re-circulation pump, according to the second embodiment of the invention, will be described with reference to FIG. 5. The portions identical to those of the first embodiment will not be described in detail.

Figure 5:
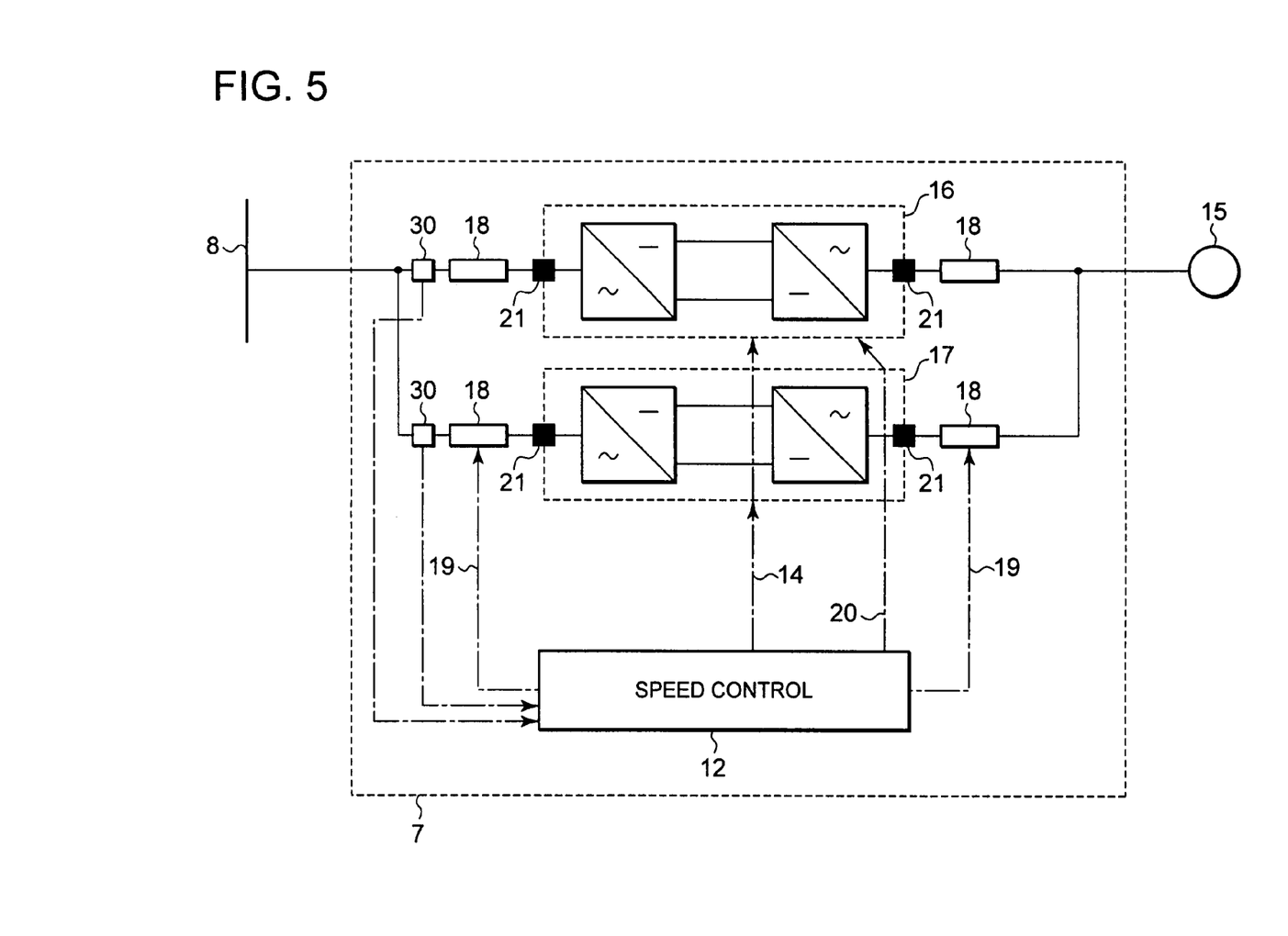
FIG. 5 is a block diagram of a power source for a re-circulation pump, according to a second embodiment of the invention.

As the block diagram of FIG. 5 shows, the banks 16 and 17 that are connected in parallel in the variable-voltage variable-frequency power source 7 can be mechanically disconnected and connected again easily at coupling units 21. This configuration helps to simplify the replacement of the bank 16 that should be repaired and maintained and to shorten the time of repairing the bank 16.

Numerous modifications and variation of the present invention are possible in light of the above teachings. It is, therefore, to be understood that, within the scope of the appended claims, the present invention can be practiced in a manner other than as specifically described herein.

What is claimed is:

1. A power source for an electric motor that drives a re-circulation pump provided in a boiling water reactor for supplying an alternating current, the power source comprising:

a first bank having an AC-to-DC forward converter and a DC-to-AC inverter that are electrically connected mutually in series, the first bank outputting an alternating current that has a voltage and frequency different from the voltage and frequency of an input alternating current;

a second bank connected in parallel to the first bank, the second bank having an AC-to-DC forward converter and a DC-to-AC inverter that are electrically connected mutually in series, and the second bank outputting an alternating current that has a voltage and frequency different from the voltage and frequency of an input alternating current;

a speed controller for controlling the first bank and the second bank, thereby to control a speed of the electric motor; and a shut-off mechanism electrically connected in series to the first bank and the second bank, the shut-off mechanism being configured to connect and disconnect the first and second banks electrically, independently of each other;

wherein the speed controller:

temporarily stops the first bank and the second bank, thereby idling the re-circulation pump, while only the first bank remains in an inoperative state;

causes the shut-off mechanism connected to the first bank to disconnect the first bank, while the re-circulation pump is idling;

re-starts only the second bank when a speed of the electric motor reaches a predetermined speed after the first bank is disconnected while the re-circulation pump is idling, thereby causing only the second bank to control the speed of the electric motor; and re-starts the first bank after controlling the speed of the electric motor by means of only the second bank, thereby causing both the first bank and the second bank to control the speed of the electric motor.

2. The power source according to claim 1, wherein the predetermined speed is a speed of the electric motor that can be controlled by the second bank only.

3. The power source according to claim 1, wherein the speed controller controls the first bank such that an output voltage of the first bank gradually increases from zero when the first bank is restarted.

4. The power source according to claim 1, wherein the speed controller temporarily stops the second bank, thereby idling the re-circulation pump again, after only the second bank controls the speed of the electric motor and before the first and second banks control the speed of the electric motor, and thereafter re-starts the first and second banks at the same time while the re-circulation pump is idling.

5. The power source according to claim 1, further comprising current detectors for detecting currents flowing in the first and second banks, respectively, wherein the speed controller determines which bank, the first bank or the second bank, is in an inoperative state, based upon a position of the current detector when the current flowing in either the first bank or the second bank, detected by one current detector, becomes outside a stipulated range.

6. The power source according to claim 1, wherein the first and second banks each has an ability of supplying more than 50% of the power that the electric motor needs to operate at a rated speed.

7. The power source according to claim 1, further comprising coupling units that can mechanically connect and disconnect the first bank and the second bank, independently.

8. A method of controlling a power source for an electric motor that drives a re-circulation pump provided in a boiling water reactor for supplying an alternating current, the power source comprising:
- a first bank having an AC-to-DC forward converter and a DC-to-AC inverter that are electrically connected mutually in series, the first bank outputting an alternating current that has a voltage and frequency different from the voltage and frequency of an input alternating current;
- a second bank connected in parallel to the first bank, the second bank having an AC-to-DC forward converter and a DC-to-AC inverter that are electrically connected mutually in series, and the second bank outputting an alternating current that has a voltage and frequency different from the voltage and frequency of an input alternating current;
- a speed controller for controlling the first bank and the second bank, thereby to control a speed of the electric motor; and
- a shut-off mechanism electrically connected in series to the first bank and the second bank, the shut-off mechanism being configured to connect and disconnect the first and second banks electrically, independently of each other;

the method comprising:
- a pump-idling step of temporarily stopping both the first bank and the second bank, thereby idling the re-circulation pump, while only the first bank remains in an inoperative state;
- a first-bank disconnecting step of causing the shut-off mechanism connected to the first bank to disconnect the first bank, in the pump-idling step;
- a second-bank driving step of re-starting only the second bank when a speed of the electric motor reaches a predetermined speed after the first-bank disconnecting step in the pump-idling step, thereby causing only the second bank to control the speed of the electric motor; and
- a restored operation step of re-starting the first bank after the second-bank driving step, thereby causing both the first bank and the second bank to control the speed of the electric motor.

9. The method according to claim 8, wherein the predetermined speed is a speed of the electric motor that can be controlled by the second bank only.

10. The method according to claim 8, wherein an output voltage of the first bank gradually increases from zero in the restored operation step.

11. The method according to claim 8, further comprising a second pump-idling step of temporarily stopping the second bank, thereby idling the re-circulation pump after the second-bank driving step and before the restored operation step; wherein
the first bank and the second bank are re-started at the same time in the restored operation step.

12. The method according to claim 8, wherein:
currents flowing in the first and second banks, respectively, are detected; and
it is determined which bank, the first bank or the second bank, is in an inoperative state, based upon a position of the current detector, when the current flowing in either the first bank or the second bank becomes outside a stipulated range.

* * * * *